United States Patent
Xu et al.

(10) Patent No.: US 12,509,989 B2
(45) Date of Patent: Dec. 30, 2025

(54) MITIGATING IMPACT OF BLADE OUT EVENT

(71) Applicant: RTX Corporation, Farmington, CT (US)

(72) Inventors: JinQuan Xu, East Greenwich, RI (US); Michael Winter, New Haven, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/654,718

(22) Filed: May 3, 2024

(65) Prior Publication Data

US 2025/0341165 A1    Nov. 6, 2025

(51) Int. Cl.
*F01D 5/14* (2006.01)
*F01D 21/04* (2006.01)
*F04D 29/38* (2006.01)

(52) U.S. Cl.
CPC ........... *F01D 5/147* (2013.01); *F01D 21/045* (2013.01); *F04D 29/388* (2013.01); *F05D 2220/323* (2013.01); *F05D 2240/30* (2013.01)

(58) Field of Classification Search
CPC ...... F01D 21/045; F01D 5/147; F04D 29/388; F05D 2220/324; F05D 2220/325; F05D 2240/30
USPC .................................................. 415/9; 416/2
See application file for complete search history.

(56) References Cited

U.S. PATENT DOCUMENTS

| | | | |
|---|---|---|---|
| 4,022,540 A * | 5/1977 | Young | F01D 17/162 55/306 |
| 7,841,834 B1 * | 11/2010 | Ryznic | F04D 29/023 416/224 |
| 10,415,588 B2 | 9/2019 | Roche | |
| 10,612,560 B2 | 4/2020 | Kray et al. | |
| 10,837,286 B2 | 11/2020 | Jain et al. | |
| 11,753,942 B1 | 9/2023 | Ganiger et al. | |
| 11,879,354 B2 | 1/2024 | Kray et al. | |
| 2017/0023009 A1 | 1/2017 | Roche | |
| 2017/0370376 A1 * | 12/2017 | Kray | F01D 5/147 |
| 2021/0108572 A1 * | 4/2021 | Khalid | F01D 7/00 |
| 2023/0003129 A1 | 1/2023 | Jain et al. | |

(Continued)

FOREIGN PATENT DOCUMENTS

| CN | 115559937 A | 1/2023 |
|---|---|---|
| CN | 116892417 A | 10/2023 |

OTHER PUBLICATIONS

Dubois et al., "CFM's RISE Engine Demonstrator Gathers Momentum," Aviation Week Intelligence Network, Jan. 2024, 2 pages.

(Continued)

*Primary Examiner* — Christopher Verdier

(57) ABSTRACT

An open rotor gas turbine engine includes a gearbox and a fan blade system coupled to the gearbox. The fan blade system includes a hub and a plurality of fan blades affixed to the hub. At least one of the fan blades includes a blade body and a break line formed within the blade body at a location that divides the blade body into sections having parametrically defined masses. The break line has less rigidity than surrounding portions of the blade body that surround the break line. The blade body of at least one fan blade is configured to break into the sections when subjected to an excessive stress.

17 Claims, 3 Drawing Sheets

(56) References Cited

U.S. PATENT DOCUMENTS

2023/0036022 A1     2/2023   Kray et al.
2024/0392855 A1    11/2024   Medeau et al.

OTHER PUBLICATIONS

European Search Report dated Aug. 19, 2025, in connection with European Patent Application No. 25174116.1, 8 pages.

* cited by examiner

MITIGATING IMPACT OF BLADE OUT EVENT

TECHNICAL FIELD

This disclosure relates generally to flight systems. More specifically, this disclosure relates to mitigating the impact of a blade out event of an open rotor system.

BACKGROUND

Among the many technical challenges associated with aircraft, one technical challenge involves mitigating fan blade out damage. Fan blade out damage refers to damage that can occur when the blade of a fan of an engine breaks while the engine is running. If a blade breaks and a large-enough piece of the blade impacts the fuselage of an aircraft, catastrophic damage to the fuselage might occur.

SUMMARY

This disclosure relates to mitigating the impact of a blade out event of an open rotor system.

In a first embodiment, a fan blade includes a blade body and a break line formed within the blade body at a location that divides the blade body into sections having parametrically defined masses. The break line has less rigidity than surrounding portions of the blade body that surround the break line. The blade body is configured to break into the sections when subjected to an excessive stress.

In a second embodiment, an open rotor fan blade system includes a hub and a plurality of fan blades affixed to or integral with the hub. At least one of the fan blades includes a blade body and a break line formed within the blade body at a location that divides the blade body into sections having parametrically defined masses. The break line has less rigidity than surrounding portions of the blade body that surround the break line. The blade body of at least one fan blade is configured to break into the sections when subjected to an excessive stress.

In a third embodiment, an open rotor gas turbine engine includes a gearbox and a fan blade system coupled to the gearbox. The fan blade system includes a hub and a plurality of fan blades affixed to or integral with the hub. At least one of the fan blades includes a blade body and a break line formed within the blade body at a location that divides the blade body into sections having parametrically defined masses. The break line has less rigidity than surrounding portions of the blade body that surround the break line. The blade body of at least one fan blade is configured to break into the sections when subjected to an excessive stress.

In some embodiments of the fan blade, the break line comprises one of multiple break lines formed in the blade body. The sections include an intermediate section located closer to a blade tip than an inner section and located farther from the blade tip than an outer section. The outer, intermediate, and inner sections respectively correspond to the parametrically defined masses $m_1$, $m_2$, and $m_3$ that are defined as: $m_1+m_2<m_3$ such that the inner section corresponds to a greater mass than a combined mass of the outer section and the intermediate section.

In some embodiments of the fan blade, the break line comprises one of multiple break lines formed in the blade body. The sections include an outer section located closer to a blade tip than a second section. The outer and second sections respectively correspond to the parametrically defined masses m1 and m2 that are defined as:

$$\frac{m_1}{m_2} = \frac{r_2}{r_1}$$

such that a ratio of the masses $m_1$ and $m_2$ is substantially equal to a ratio of radiuses r1 and r2 that respectively correspond to the outer and second sections. Each of the radiuses $r_1$ and $r_2$ define a distance from the center of the fan rotation to a center of gravity of the outer and second sections, respectively.

In some embodiments of the fan blade, the break line comprises one of multiple break lines formed in the blade body. The sections include an intermediate section located closer to a blade tip than an inner section and located farther from the blade tip than an outer section. The outer, intermediate, and inner sections respectively correspond to the parametrically defined masses $m_1$, $m_2$, and $m_3$ that are defined as: $m_1<m_2<m_3$ such that the outer section corresponds to lesser mass than the intermediate section and the intermediate section corresponds to lesser mass than the inner section.

In some embodiments of the fan blade, the break line comprises one of multiple break lines formed in the blade body. The sections include an intermediate section located closer to a blade tip than an inner section and located farther from the blade tip than an outer section. The outer, intermediate, and inner sections respectively correspond to the parametrically defined masses $m_1$, $m_2$, and $m_3$ such that each of the sections has a maximum momentum that is substantially equivalent to other sections.

In some embodiments of the fan blade, the break line comprises one of multiple break lines formed in the blade body. The sections include an intermediate section located closer to a blade tip than an inner section and located farther from the blade tip than an outer section. The outer, intermediate, and inner sections respectively correspond to the parametrically defined masses $m_1$, $m_2$, and $m_3$ such that each of the sections has a maximum kinetic energy that is substantially equivalent to other sections.

In some embodiments of the fan blade, the break line comprises one of multiple break lines formed in the blade body. The sections include an outer section located closer to a blade tip than a second section. The outer and second sections respectively correspond to the parametrically defined masses $m_1$ and $m_2$ that are defined as:

$$\frac{m_1}{m_2} = \frac{r_2^2}{r_1^2}$$

such that a ratio of the masses $m_1$ and $m_2$ is substantially equal to a ratio of mathematical squares of radiuses $r_1$ and $r_2$ that respectively correspond to the outer and second sections. Each of the radiuses $r_1$ and $r_2$ define a distance from the center of the fan rotation to a center of gravity of the outer and second sections, respectively.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
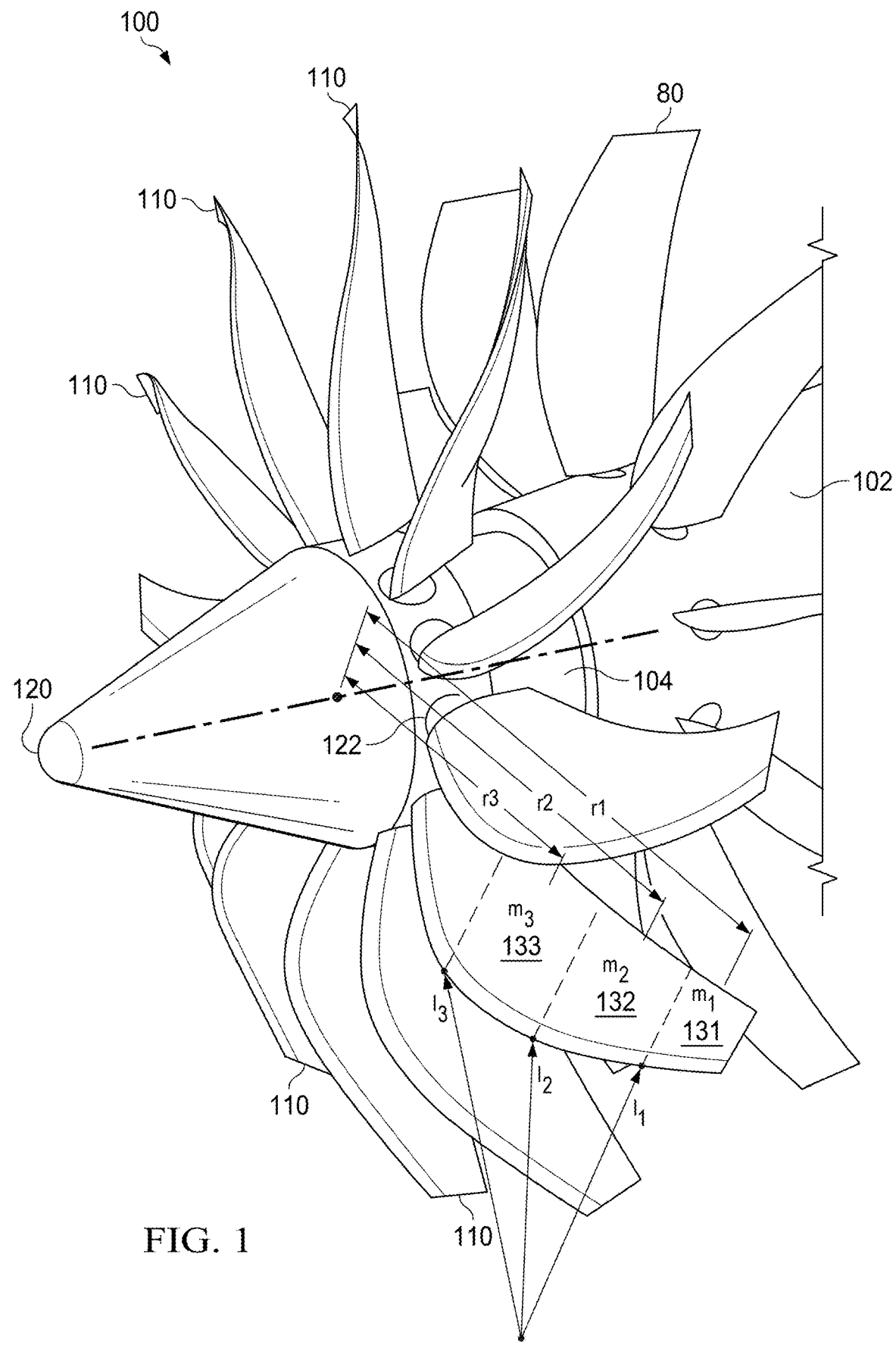
FIG. 1 illustrates an example fan blade system configured to mitigate the impact of a blade out event according to embodiments of this disclosure.
Figure 2:
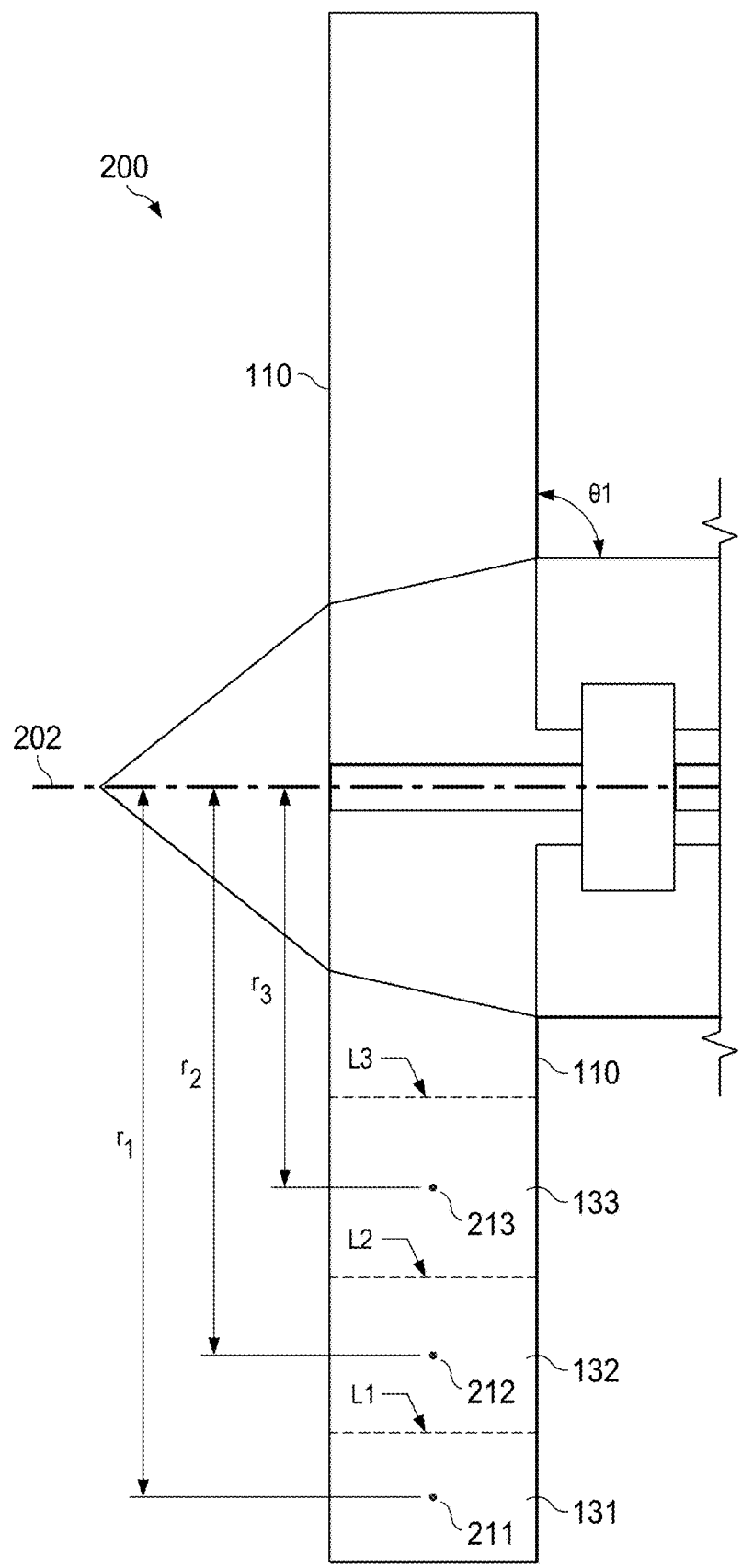
FIG. 2 illustrates an example open rotor fan blade system that includes the fan blade system of FIG. 1, according to embodiments of this disclosure.
Figure 3:
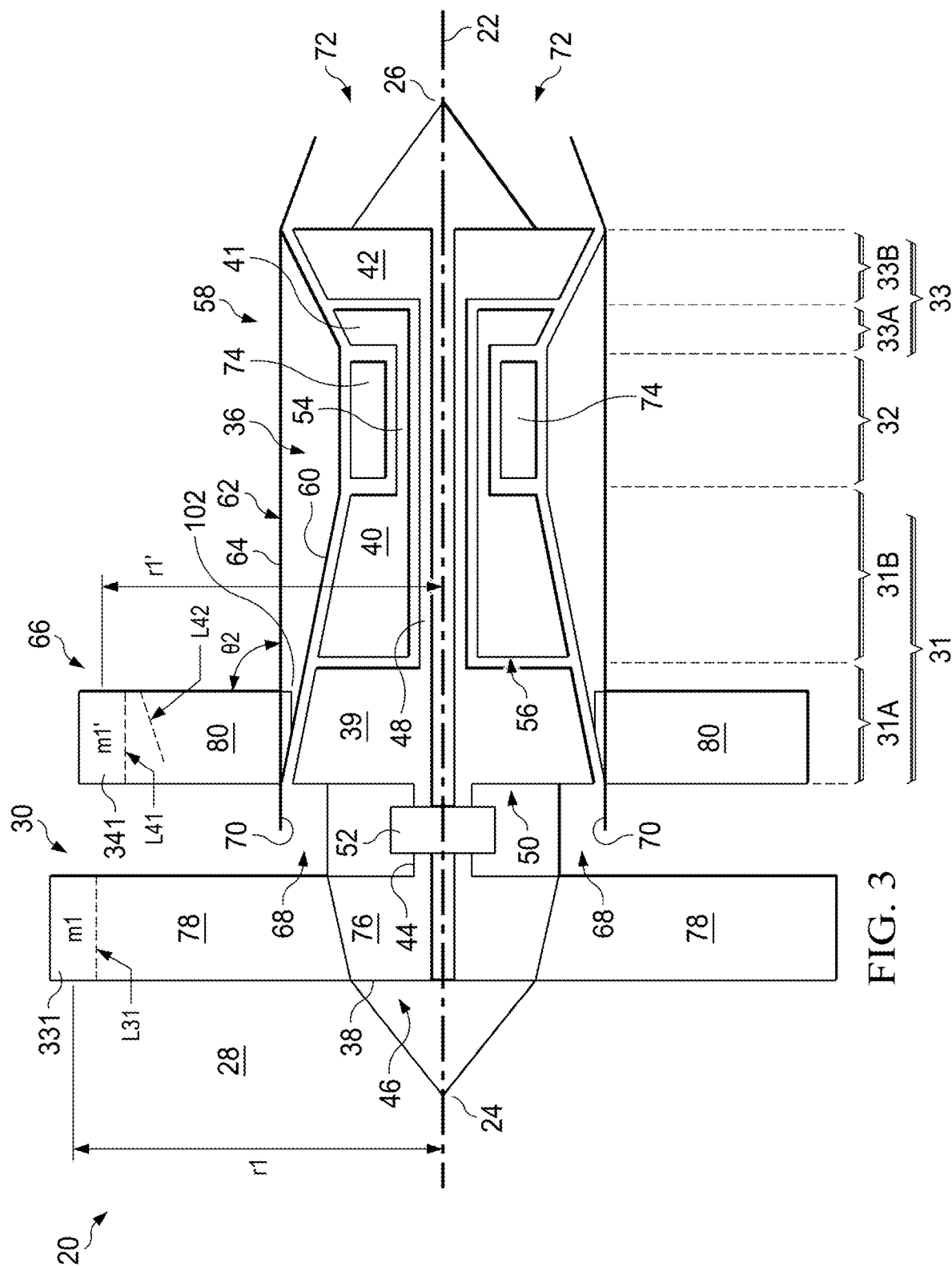
FIG. 3 illustrates an example propulsion system for an aircraft according to embodiments of this disclosure.

FIGS. 1 through 3 described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

This disclosure provides a fan blade designed to break into smaller and less damaging pieces, which includes optimizing momentum (M), kinetic energy (E), shape and size of smaller and less damaging pieces. Momentum is expressed according to Equation 1, where m denotes mass, and v denotes velocity. Kinetic energy is expressed according to Equation 2.

$$M = mv \tag{1}$$

$$E = \frac{1}{2}mv^2 \tag{2}$$

For a spinning blade, the outer portion of the blade has more kinetic energy and momentum than the inner portion for a same mass. That is, as the angular velocity ($\omega$) of a spinning blade is uniform from root to tip, the blade tip speed (such as the tangential velocity of the outermost portion of the blade) is greater than the speed (v) of the root of the blade that is located at the root of the fan. Tangential velocity is expressed according to Equation 3, where r denotes radius, such as the distance from the center of the fan rotation to the location of the portion of the blade.

$$v = \omega r \tag{3}$$

For broken pieces of a same mass that impact an object, the outer piece would cause more damage to the impacted object than the inner piece would cause. This is because the outer piece would break off and travel at the tangential velocity that is closer to the blade tip speed, yet the inner piece would travel at a tangential velocity that is slower from the blade tip speed.

FIG. 1 illustrates an example fan blade system 100 configured to mitigate the impact of a blade out event according to embodiments of this disclosure. In some embodiments, the fan blade system 100 can be part of an open rotor gas turbine engine 102, such as an open rotor engine of an aircraft, which may include a gearbox 104. As particular examples, the fan blade system 100 can have a puller configuration located at the front of a nacelle or can include a pusher fan blade system located at the rear of a nacelle.

As shown here, the fan blade system 100 includes multiple fan blades 110 spanning a diameter that can represent a number of feet, such as between ten (10) and twenty (20) feet (about 3.0 meters to 6.1 meters). As a particular example, the diameter of the multiple fan blades 110 can span about 14 feet to about 15 feet (i.e., about 4.27 meters to about 4.57 meters).

The multiple fan blades 110 are connected to a hub 120 at points of attachment 122, respectively. The blades 110 can be affixed to or be integral with the hub 120, such that the blades 110 extend radially from the hub. That is, the fan blade system 100 includes the hub 120 that can be rotated, for example, driven by a shaft that is driven by a turbine of a gas turbine engine. As another example, additionally or alternatively, the fan blade system 100 may be driven by a shaft that is driven by an electric motor. The hub 120 and attached fan blades 110 rotate together, in unison.

Government agencies, such as the U.S. Federal Aviation Administration (FAA), require aircraft to undergo aviation safety testing for airworthiness. Moreover, blade containment regulations often require blade out testing (also referred to as blade off testing) to demonstrate that an aircraft having a jet engine is able to survive a fan blade breaking off within the engine operating at maximum permissible revolutions per minute without fragments being thrown through the engine housing. In the case of propellers, design precautions can be taken to minimize damage to the structure and vital systems of the aircraft due to impact of a failed or released blade and the unbalance created by such blade release by a failure of a hub 120 or blade 110. For various reasons, a fan blade 110 could break such that one or more uncontained fragments are released (such as thrown), such as due to a collision impact. Such a blade 110 break would occur due to the blade 110 being subjected to an excessive stress (e.g., stress above a threshold stress), such as a collision impact having greater than a specified mass, momentum, or kinetic energy that the blade is designed and built to withstand.

According to embodiments of this disclosure, a blade body of each blade 110 is configured to break into sections when subjected to an excessive stress. That is, the blade 110 is designed such that, when the blade 110 breaks, an outer fragment 131 (a broken piece) is smaller in mass than an inner fragment 132 so that the two fragments maintain a substantially equal kinetic energy or momentum. In this example, each blade 110 includes one or more break lines $L_1$, $L_2$, and $L_3$ that control where the blade 110 breaks. In some cases, the number of break lines depends on the length or mass of the blade 110 from root to tip, maximum permissible revolutions per minute, and other FAA regulatory requirements, etc. In some embodiments, the number of break lines is specified, such as a number between 1 and 10 (such as, 1-10 break lines, 2-8 break lines, or 3-5 break lines). The length of the blade 110 is also referred to as the blade span and can be defined as the radial distance between the leading edge at the root of the blade 110 and the leading edge at the tip of the blade 110.

Each of the break lines $L_1$, $L_2$, and $L_3$ is formed within the blade body at a location and establishes a path within the body of the blade 110 such that a break of the blade 110 along the break lines divide the blade into sections 131-133 of predetermined parametrically-defined masses $m_1$, $m_2$, and $m_3$. In this disclosure, the sections 131-133 are part of the blade 110 prior to being broken off but may be referred to as fragments after being broken off from the blade 110. The paths of the break lines $L_1$, $L_2$, and $L_3$ can be fully or partially across the blade body of each blade 110 laterally between the leading edge and the trailing edge. A break line may be linear or non-linear. A break line may be angled in any suitable orientation, for example, substantially parallel to the engine axis (202 of FIG. 2) of rotation, substantially perpendicular to the engine axis of rotation, or at any angle in between.

In some embodiments, the masses $m_1$, $m_2$, and $m_3$ can be parametrically defined according to Equation 4 such that the section 132 located closer to the blade tip has a mass $m_2$ that is less than the mass $m_3$ of a section 133 located farther from the blade tip and such that the mass $m_2$ of the section 132 located farther from the blade tip is greater than the mass m of any section 131 located closer to or at the blade tip.

$$m_1 < m_2 < m_3 \quad (4)$$

The radius $r_1$, $r_2$, and $r_3$ of each of the sections 131, 132, and 133 refers to the distance from the center of the fan rotation to the location of the center of gravity of the section of the blade 110, respectively. The center of the fan rotation can be at the hub 120.

In some embodiments, the masses $m_1$, $m_2$, and $m_3$ can be parametrically defined according to Equation 5 such that multiple sections 131-132 located closer to the blade tip have a combined mass $m_1+m_2$ that is less than the mass $m_3$ of a section 133 located farther from the blade tip.

$$m_1 + m_2 < m_3 \quad (5)$$

In some cases, the combined mass $m_1+m_2$ can be from the combination of multiple sections 131-132 that have substantially equivalent masses as one another ($m_1 \approx m_2$).

In some embodiments, the masses $m_1$, $m_2$, and $m_3$ can be parametrically defined according to Equation 6a, Equation 6b, Equation 6c, Equation 6d, Equation 7a, Equation 7b, Equation 7c, Equation 7d, or Equations 8-10 such that each of the sections 131-133 has a maximum kinetic energy substantially equivalent to each other section. In some embodiments, substantially equivalent can be within 5% or within 3% or within 1%.

$$\frac{1}{2}m_1 v_1^2 = \frac{1}{2}m_2 v_2^2 \quad (6a)$$

$$\frac{1}{2}m_1 v_1^2 = \frac{1}{2}m_3 v_3^2 \quad (6b)$$

$$\frac{1}{2}m_2 v_2^2 = \frac{1}{2}m_3 v_3^2 \quad (6c)$$

$$\frac{1}{2}m_1 v_1^2 = \frac{1}{2}m_2 v_2^2 = \frac{1}{2}m_3 v_3^2 \quad (6d)$$

$$\frac{1}{2}m_1(\omega r_1)^2 = \frac{1}{2}m_2(\omega r_2)^2 \quad (7a)$$

$$\frac{1}{2}m_1(\omega r_1)^2 = \frac{1}{2}m_3(\omega r_3)^2 \quad (7b)$$

$$\frac{1}{2}m_2(\omega r_2)^2 = \frac{1}{2}m_3(\omega r_3)^2 \quad (7c)$$

$$\frac{1}{2}m_1(\omega r_1)^2 = \frac{1}{2}m_2(\omega r_2)^2 = \frac{1}{2}m_3(\omega r_3)^2 \quad (7d)$$

$$\frac{m_1}{m_2} = \frac{r_2^2}{r_1^2} \quad (8)$$

$$\frac{m_1}{m_3} = \frac{r_3^2}{r_1^2} \quad (9)$$

$$\frac{m_2}{m_3} = \frac{r_3^2}{r_2^2} \quad (10)$$

The sections 131-133 of the blade 110 share the same angular velocity ($\omega$) but have different tangential velocities $v_1$, $v_2$, and $v_3$. For example, the section 132 has a tangential velocity $v_2$ that is greater than the tangential velocity $v_3$ of the section 133 and that is less than the tangential velocity $v_1$ of the section 131. This is because the section 132 has a radius $r_2$ that is greater than the radius $r_3$ of the section 133 and less than that radius $r_1$ of the section 131 as shown in Equation 11.

$$r_1 > r_2 > r_3 \quad (11)$$

The maximum kinetic energy of a blade fragment can depend upon on specifications of the aircraft fuselage, which in some cases may be defined as less than a kinetic energy of collision impact(s) that the fuselage can withstand (such as absorb) without fuselage failure. In reverse, the design of a fuselage can depend upon specifications of the blade sections 131-133, which in some cases may be designed to withstand a collision impact having a maximum kinetic energy of a blade section 131-133 released while the blade was spinning at a specified angular velocity (such as maximum revolutions per minute).

In some embodiments, the masses $m_1$, $m_2$, and $m_3$ can be parametrically defined according to Equation 12a, Equation 12b, Equation 12c, Equation 12d, Equation 13a, Equation 13b, Equation 13c, Equation 13d, or Equations 14-16 such that each of the sections 131-133 has a momentum substantially equivalent to each other section. In some embodiments, substantially equivalent can be within 5% or within 3% or within 1%.

$$m_1 v_1 = m_2 v_2 = m_3 v_3 \quad (12a)$$

$$m_1 v_1 = m_2 v_2 \quad (12b)$$

$$m_1 v_1 = m_3 v_3 \quad (12c)$$

$$m_2 v_2 = m_3 v_3 \quad (12d)$$

$$m_1 \omega r_1 = m_2 \omega r_2 \quad (13a)$$

$$m_1 \omega r_1 = m_3 \omega r_3 \quad (13b)$$

$$m_2 \omega r_2 = m_3 \omega r_3 \quad (13c)$$

$$m_1 \omega r_1 = m_2 \omega r_2 = m_3 \omega r_3 \quad (13d)$$

$$\frac{m_1}{m_2} = \frac{r_2}{r_1} \quad (14)$$

$$\frac{m_1}{m_3} = \frac{r_3}{r_1} \quad (15)$$

$$\frac{m_2}{m_3} = \frac{r_3}{r_2} \quad (16)$$

The sections 131-133 of the blade 110 share the same angular velocity ($\omega$) but have different tangential velocities $v_1$, $v_2$, and $v_3$ as noted above.

To control where each blade 110 breaks, each break line $L_1$, $L_2$, and $L_3$ can have less rigidity than surrounding portions of the blade body that surround the break line. For example, the break lines $L_1$-$L_3$ can include a score line, a spar notch, or a composite material woven to make the blade 110 easier to break at the break line $L_1$, $L_2$, or $L_3$ upon an impact compared to breaking at other points not along the break lines $L_1$-$L_3$. These break lines $L_1$-$L_3$ enable the blades 110 to reduce (and possibly minimize) the risk of breakoff of a larger fragment having a greater mass, momentum, or kinetic energy than a single section 131, 132, or 133. As an example, the break lines $L_1$-$L_3$ may be formed using spar notch, which may be the same as or similar to spars described in U.S. Pat. No. 11,879,354.

In some instances, each blade 110 might initially break at the second break line $L_2$ such that a multi-section fragment having a mass $m_1+m_2$ is released. This multi-section fragment (including the first and second sections 131 and 132) can impact the fuselage with a greater momentum or greater kinetic energy than a single-section fragment 131 or 132. To reduce the chances of a multi-section fragment impacting other portions of the aircraft, the blade 110 can be designed to be easier to break at the first break line $L_1$ than at the second break line $L_2$ or at the third break line $L_3$ upon an impact in order to reduce the risk of breakoff of a larger fragment, such as the multi-section fragment. Similarly, the blade 110 can be designed to be easier to break at the second break line $L_2$ than at the third break line $L_3$ upon an impact in order to reduce the risk of breakoff of a larger fragment, such as the multi-section fragment. In some embodiments, for instance, each blade 110 can have deeper score lines or other less-rigid areas toward the blade tip and shallower score lines or other more-rigid areas toward the blade root. Thus, for example, score lines can be deeper and/or wider at the first break line $L_1$ than at the second break line $L_2$ and at the third break line $L_3$, and score lines can be deeper and/or wider at the second break line $L_2$ than at the third break line $L_3$. The depth of a score line can be measured in a cross-section view of the blade between pressure side and suction side of the blade 110, and a width of the score line can be measured along a longitude of the blade between leading edge and trailing edge of the blade 110.

Although FIG. 1 illustrates one example of a fan blade system 100 configured to mitigate the impact of a blade out event, various changes may be made to FIG. 1. For example, the fan blade system 100 may include any desired number of fan blades 110, and each fan blade 110 may include any suitable number of break lines. As another example, the fan blade system 100 can include vanes 80 described further below.

FIG. 2 illustrates an example open rotor fan blade system 200 that includes the fan blade system 100 of FIG. 1, according to embodiments of this disclosure. As shown, the open rotor fan blade system 200 includes an engine that drives a shaft to rotate about an engine axis 202.

The blades 110 rotate about the engine axis 202. The radius $r_1$, $r_2$, and $r_3$ of each of the sections 131, 132, and 133 refers to the distance from the engine axis 202 to the location of the center of gravity 211, 212, 213 of the section of the blade 110, respectively. The engine axis 202 can define the center of the fan rotation of the fan blade system 100 of FIG. 1. The blades 110 may be angled in any suitable orientation, for example, substantially perpendicular to the engine axis 202 of rotation, or at any blade angle θ1.

Although FIG. 2 illustrates one example of an open rotor fan blade system 200 configured to mitigate the impact of a blade out event, various changes may be made to FIG. 2. For example, the open rotor fan blade system 200 may include multiple of fan blade systems 100 attached to and rotating about the same engine axis 202.

FIG. 3 illustrates an example propulsion system 20 for an aircraft according to embodiments of this disclosure. The aircraft may be an airplane, a drone (e.g., an unmanned aerial vehicle (UAV)) or any other manned or unmanned aerial vehicle or system. The aircraft propulsion system 20 extends axially along an axis 22 between a forward, upstream end 24 of the aircraft propulsion system 20 and an aft, downstream end 26 of the aircraft propulsion system 20. The axis 22 may be a centerline axis of the aircraft propulsion system 20 and/or one or more of its members. The axis 22 may also or alternatively be a rotational axis of one or more members of the aircraft propulsion system 20.

The aircraft propulsion system 20 is configured as an open rotor propulsion system, for example, a single rotor and swirl recovery vane (SRV) open rotor propulsion system. Here, the term "open" may describe a propulsion system section and/or a propulsion system component that is open to an environment 28 (e.g., an ambient environment) external to the aircraft propulsion system 20 and, more generally, the aircraft. The aircraft propulsion system 20, for example, includes an open propulsion section 30, a compressor section 31, a combustor section 32 and a turbine section 33. The compressor section 31 includes a low pressure compressor (LPC) section 31A and a high pressure compressor (HPC) section 31B. The turbine section 33 includes a high pressure turbine (HPT) section 33A and a low pressure turbine (LPT) section 33B. At least (or only) the LPC section 31A, the HPC section 31B, the combustor section 32, the HPT section 33A and the LPT section 33B collectively form a gas generator 36 (for example, a turbine engine core).

The propulsion section 30 includes a bladed propulsor rotor 38. The propulsor rotor 38 is configured as an open rotor (e.g., an un-ducted rotor) which projects radially into and is exposed to the external environment 28. The LPC section 31A includes a low pressure compressor (LPC) rotor 39. The HPC section 31B includes a high pressure compressor (HPC) rotor 40. The HPT section 33A includes a high pressure turbine (HPT) rotor 41. The LPT section 33B includes a low pressure turbine (LPT) rotor 42. Each of the bladed rotors 39-42 is configured as a ducted rotor internal within the aircraft propulsion system 20 and outside of the external environment 28.

The propulsor rotor 38 is connected to a propulsor shaft 44. At least (or only) the propulsor rotor 38 and the propulsor shaft 44 collectively form a propulsor rotating assembly 46. This propulsor rotating assembly 46 and its members 38 and 44 are rotatable about the axis 22.

The LPC rotor 39 is coupled to and rotatable with the LPT rotor 42. For example, the LPC rotor 39 is connected to the LPT rotor 42 through a low speed shaft 48. At least (or only) the LPC rotor 39, the LPT rotor 42 and the low speed shaft 48 collectively form a low speed rotating assembly 50, for example, a low speed spool of the gas generator 36. This low speed rotating assembly 50 and its members 39, 42 and 48 are rotatable about the axis 22; however, it is contemplated the low speed rotating assembly 50 may alternatively be rotatable about another axis radially and/or angularly offset from the axis 22. The low speed rotating assembly 50 is also coupled to the propulsor rotating assembly 46. For example, the low speed rotating assembly 50 is connected to the propulsor rotating assembly 46 through a geartrain 52 (e.g., an epicyclic gear system, a transmission, etc.). With this arrangement, the low speed rotating assembly 50 and its LPT rotor 42 may rotate at a different (e.g., faster) rotational velocity than the propulsor rotating assembly 46 and its propulsor rotor 38. However, it is contemplated the propulsor rotor 38 may alternatively be coupled to the low speed rotating assembly 50 and its LPT rotor 42 without the geartrain 52 such that the LPT rotor 42 may directly drive rotation of the propulsor rotor 38 through a shaft (e.g., the low speed shaft 48) or a shaft assembly.

The HPC rotor 40 is coupled to and rotatable with the HPT rotor 41. For example, the HPC rotor 40 is connected to the HPT rotor 41 through a high speed shaft 54. At least (or only) the HPC rotor 40, the HPT rotor 41 and the high speed shaft 54 collectively form a high speed rotating assembly 56 (for example, a high speed spool of the gas generator 36). This high speed rotating assembly 56 and its members 40, 41 and 54 are rotatable about the axis 22; however, it is contemplated the high speed rotating assembly 56 may alternatively be rotatable about another axis radially and/or angularly offset from the axis 22. Though illustrated as a two spool assembly, different configurations are contemplated herein. For example, the propulsion system 20 may be a three-spool engine, configured with an intermediate spool.

The engine sections 30, 31A, 31B, 32, 33A and 33B may be arranged sequentially along the axis 22 and are housed within a stationary propulsion system housing 58 of the aircraft propulsion system 20. This propulsion system housing 58 includes a gas generator case 60 (e.g., a core case) and a nacelle 62. The generator case 60 houses one or more of the propulsion system sections 31A-33B (for example, the gas generator 36). The generator case 60, for example, extends axially along (e.g., axially overlaps) and extends circumferentially about (e.g., circumscribes) the engine sections 31A-33B and their respective bladed rotors 39-42. The generator case 60 may also house the geartrain 52. The nacelle 62 houses and provides an aerodynamic cover over the generator case 60. An exterior wall 64 of the nacelle 62 is disposed radially outboard of, extends axially along (e.g., axially overlaps) and extends circumferentially about (e.g., circumscribes) the gas generator 36 and its generator case 60. With this arrangement, the bladed rotors 39-42 are disposed within the propulsion system housing 58. The propulsor rotor 38 is disposed at least partially (or completely) outside of the propulsion system housing 58.

During operation of the aircraft propulsion system 20, ambient air within the external environment 28 is propelled by the propulsor rotor 38 in an aft, downstream direction towards the propulsion system downstream end 26. A major portion (e.g., more than 50%) of this air bypasses the gas generator 36 to provide forward thrust while a minor portion (e.g., less than 50%) of the air flows into the gas generator 36. An outer stream of the air propelled by the propulsor rotor 38, for example, flows axially across a guide vane structure 66 of the propulsion section 30 and outside of the propulsion system housing 58 (along the nacelle wall 64). The guide vane structure 66 is configured to condition (e.g., straighten out) the air propelled by the propulsor rotor 38, for example, to remove or reduce circumferential swirl and thereby enhance the forward thrust. Particularly, the aircraft propulsion system 20 includes vanes 80 that are sized, shaped, and configured to impart a counteracting swirl to the fluid so that in a downstream direction aft of both propulsor blades 78 and vanes 80 the fluid has a greatly reduced degree of swirl, which translates to an increased level of induced efficiency. Vanes 80 may have a shorter span than propulsor blades 78, as shown in FIG. 3, for example, 50% of the span of propulsor blades 78, or may have a longer span or the same span as propulsor blades 78 as desired. Vanes 80 may be attached to an aircraft structure associated with the propulsion system or another aircraft structure such as a wing, pylon, or fuselage. Vanes 80 are stationary, for example, non-rotating with respect to the axis 22. Vanes 80 may be fewer or greater in number than, or the same in number as, the number of propulsor blades 78 and typically greater than two, or greater than four, in number.

An inner stream of the air propelled by the propulsor rotor 38 flows through an airflow inlet 68 of a core flowpath 70 into the aircraft propulsion system 20 and its gas generator 36. The core flowpath 70 extends sequentially through the LPC section 31A, the HPC section 31B, the combustor section 32, the HPT section 33A and the LPT section 33B from the core inlet 68 to a combustion products exhaust 72 from the core flowpath 70 into the external environment 28. The air entering the core flowpath 70 may be referred to as "core air".

The core air is compressed by the LPC rotor 39 and the HPC rotor 40 and directed into a combustion chamber 74 (e.g., an annular combustion chamber) of a combustor (e.g., an annular combustor) in the combustor section 32. Fuel is injected into the combustion chamber 74 and mixed with the compressed core air to provide a fuel-air mixture. This fuel-air mixture is ignited and combustion products thereof flow through and sequentially drive rotation of the HPT rotor 41 and the LPT rotor 42. The rotation of the HPT rotor 41 and the LPT rotor 42 respectively drive rotation of the HPC rotor 40 and the LPC rotor 39 and, thus, compression of the air received from the core inlet 68. The rotation of the LPT rotor 42 also drives rotation of the propulsor rotor 38 through the geartrain 52. The rotation of the propulsor rotor 38, in turn, propels the ambient air within the external environment 28 in the aft, downstream direction. With this arrangement, the gas generator 36 powers operation of (e.g., drives rotation of) the propulsor rotor 38 during aircraft propulsion system operation.

The propulsor rotor 38 includes a propulsor rotor base 76 (e.g., a disk or a hub) and a plurality of open propulsor blades 78 (e.g., airfoils). The propulsor blades 78 are arranged circumferentially about the rotor base 76 and the axis 22 in an array (for example, a circular array). Each of the propulsor blades 78 is connected to (e.g., formed integral with or otherwise attached to) the rotor base 76.

Although FIG. 3 illustrates one example of an aircraft propulsion system 20 configured to mitigate the impact of a blade out event, various changes may be made to FIG. 3. For example, the aircraft propulsion system 20 may include the open rotor fan blade system 200 of FIG. 2. The axis 22 of FIG. 3 can be the same as the engine axis 202 of FIG. 2. The plurality of open propulsor blades 78 of FIG. 3 can be the same as the multiple fan blades 110 of FIG. 1. As another example, aircraft propulsion system 20 can be configured to include a contra rotating open rotor (CROR) engine that includes two rows of propellers, or fans, which rotate in opposite directions.

In the case of the aircraft propulsion system 20 including the CROR engine, reference number 80 does not refer to stationary vanes 80, but instead refers to a second set of CROR blades 80 that rotate about the engine axis 22 in an opposite direction (e.g., counter clockwise) compared to the direction (e.g., clockwise) that the propulsor blades 78 rotate. The CROR blades 80 may be angled in any suitable orientation, for example, substantially perpendicular to the engine axis 202 of rotation, or at any CROR blade angle θ2.

The break line L31 of the propulsor blades 78 can be the same as the break line L1 of FIG. 1. Similarly, the outer section 331 having a mass m1 can be the same as or similar to the outer section 131 of FIG. 1. The CROR blade 80 may also be designed to include break lines L41-L42 that break in a similar manner as the break lines L1 and L2 of FIG. 1.

The break lines L31 and L41-L42 of this disclosure can be: fully or partially across the blade body of the blade laterally between the leading edge and the trailing edge; linear or non-linear; and angled in any suitable orientation inclusively between substantially parallel to the engine axis 22 of rotation and substantially perpendicular to the engine axis 22 of rotation. For example, the break lines L31 and L41 extend fully across the blade body substantially parallel to the engine axis 22, and the break line L42 extends partially across the CROR blade 80 at a break line angle that is non-parallel and non-perpendicular relative to an edge of the CROR blade 80, such as relative to a trailing edge of the CROR blade 80.

More particularly, the CROR blade 80 is designed such that, when the CROR blade 80 breaks, an outer fragment 341 (having a mass m1') smaller in mass than an inner fragment of the CROR blade 80 so that the two fragments of the CROR blade 80 maintain a substantially equal kinetic energy or momentum. In some embodiments, the masses $m_1$ and $m_1'$ can be parametrically defined according to Equation 17 such that the outer section 331 of the propulsor blades 78 has a momentum substantially equivalent to a momentum of the outer section 341 of the CROR blade 80. In some embodiments, the masses $m_1$ and $m_1'$ can be parametrically defined according to Equation 18 such that the outer section 331 of the propulsor blade 78 has a kinetic energy substantially equivalent to a kinetic energy of the outer section 341 of the CROR blade 80. The radius $r_1$ and $r_1'$ of each of the sections 331 and 341, respectively, refers to the distance from the center of the fan rotation (such as the engine axis 22) to the location of the center of gravity of the section of the propulsor blades 78 and the CROR blade 80, respectively.

$$m_1\omega_1 r_1 = m_1'\omega_1' r_1' \tag{17}$$

$$\frac{1}{2}m_1(\omega_1 r_1)^2 = \frac{1}{2}m_1'(\omega_1' r_1')^2 \tag{18}$$

It may be advantageous to set forth definitions of certain words and phrases used throughout this patent document. The term "couple" and its derivatives refer to any direct or indirect communication between two or more components, whether or not those components are in physical contact with one another. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A fan blade comprising:
  a blade body; and
  a break line formed within the blade body at a location that laterally divides the blade body into sections having parametrically defined masses, the break line having less rigidity than surrounding portions of the blade body that surround the break line, the sections including an outer section located closer to a blade tip than an inner section;
  wherein:
    the blade body is configured to break into the sections when subjected to an excessive stress;
    at least two of the parametrically defined masses are defined relative to each other;
    the break line comprises one of multiple break lines formed in the blade body;
    the sections include an intermediate section located closer to the blade tip than the inner section and located farther from the blade tip than the outer section; and
    the outer, intermediate, and inner sections respectively correspond to the parametrically defined masses $m_1$, $m_2$, and $m_3$ such that each of the sections has a maximum momentum that is substantially equivalent to the maximum momentums of the other sections.

2. The fan blade of claim 1, wherein the parametrically defined masses $m_1$, $m_2$, and $m_3$ are defined as:

$$m_1 + m_2 < m_3$$

such that the inner section corresponds to a greater mass than a combined mass of the outer section and the intermediate section.

3. The fan blade of claim 1, wherein the parametrically defined masses $m_1$ and $m_2$ are defined as:

$$\frac{m_1}{m_2} \approx \frac{r_2}{r_1}$$

such that a ratio of the masses $m_1$ and $m_2$ is substantially equal to a ratio of radiuses $r_1$ and $r_2$ that respectively correspond to the outer and intermediate sections; and each of the radiuses $r_1$ and $r_2$ define a distance from a center of fan rotation to a center of gravity of the outer and intermediate sections, respectively.

4. The fan blade of claim 1, wherein the parametrically defined masses $m_1$, $m_2$, and $m_3$ are defined as:

$$m_1 < m_2 < m_3$$

such that the outer section corresponds to lesser mass than the intermediate section and the intermediate section corresponds to lesser mass than the inner section.

5. The fan blade of claim 1, wherein:
  the parametrically defined masses $m_1$, $m_2$, and $m_3$ are such that each of the sections has a maximum kinetic energy that is substantially equivalent to the maximum kinetic energies of the other sections.

6. The fan blade of claim 1, wherein the parametrically defined masses $m_1$ and $m_2$ that are defined as:

$$\frac{m_1}{m_2} \approx \frac{r_2^2}{r_1^2}$$

such that a ratio of the masses $m_1$ and $m_2$ is substantially equal to a ratio of mathematical squares of radiuses $r_1$ and $r_2$ that respectively correspond to the outer and intermediate sections; and each of the radiuses $r_1$ and $r_2$ define a distance from a center of fan rotation to a center of gravity of the outer and intermediate sections, respectively.

7. An open rotor fan blade system comprising:
a hub; and
a plurality of fan blades affixed to or integral with the hub;
wherein at least one of the fan blades includes:
   a blade body; and
   a break line formed within the blade body at a location that laterally divides the blade body into sections having parametrically defined masses, the break line having less rigidity than surrounding portions of the blade body that surround the break line, the sections including an outer section located closer to a blade tip than an inner section;
   wherein the blade body is configured to break into the sections when subjected to an excessive stress,
   wherein at least two of the parametrically defined masses are defined relative to each other,
wherein, for each of the at least one of the fan blades:
   the break line comprises one of multiple break lines formed in the blade body;
   the sections include an intermediate section located closer to the blade tip than the inner section and located farther from the blade tip than the outer section; and
   the outer, intermediate, and inner sections respectively correspond to the parametrically defined masses $m_1$, $m_2$, and $m_3$ such that each of the sections has a maximum momentum that is substantially equivalent to the maximum momentums of the other sections.

8. The open rotor fan blade system of claim 7, wherein outer, intermediate, and inner sections respectively correspond to the parametrically defined masses $m_1$, $m_2$, and $m_3$ are defined as:

$$m_1+m_2<m_3$$

such that the inner section corresponds to a greater mass than a combined mass of the outer section and the intermediate section.

9. The open rotor fan blade system of claim 8, wherein the parametrically defined masses $m_1$, $m_2$, and $m_3$ are defined as:

$$m_1<m_2<m_3$$

such that the outer section corresponds to lesser mass than the intermediate section and the intermediate section corresponds to lesser mass than the inner section.

10. The open rotor fan blade system of claim 7, wherein the parametrically defined masses $m_1$ and $m_2$ are defined as:

$$\frac{m_1}{m_2} \approx \frac{r_2}{r_1}$$

such that a ratio of the masses $m_1$ and $m_2$ is substantially equal to a ratio of radiuses $r_1$ and $r_2$ that respectively correspond to the outer and intermediate sections; and each of the radiuses $r_1$ and $r_2$ define a distance from a center of fan rotation to a center of gravity of the outer and intermediate sections, respectively.

11. The open rotor fan blade system of claim 7, wherein the parametrically defined masses $m_1$, $m_2$, and $m_3$ are such that each of the sections has a maximum kinetic energy that is substantially equivalent to the maximum kinetic energies of the other sections.

12. The open rotor fan blade system of claim 7, wherein the parametrically defined masses $m_1$ and $m_2$ are defined as:

$$\frac{m_1}{m_2} \approx \frac{r_2^2}{r_1^2}$$

such that a ratio of the masses $m_1$ and $m_2$ is substantially equal to a ratio of mathematical squares of radiuses $r_1$ and $r_2$ that respectively correspond to the outer and intermediate sections; and each of the radiuses $r_1$ and $r_2$ define a distance from a center of fan rotation to a center of gravity of the outer and intermediate sections, respectively.

13. An open rotor gas turbine engine comprising:
a gearbox; and
a fan blade system coupled to the gearbox, the fan blade system comprising:
   a hub; and
   a plurality of fan blades affixed to or integral with the hub;
   wherein at least one of the fan blades includes:
      a blade body; and
      a break line formed within the blade body at a location that laterally divides the blade body into sections having parametrically defined masses, the break line having less rigidity than surrounding portions of the blade body that surround the break line, the sections including an outer section located closer to a blade tip than an inner section;
      wherein the blade body is configured to break into the sections when subjected to an excessive stress,
   wherein at least two of the parametrically defined masses are defined relative to each other,
   wherein, for each of the at least one of the fan blades:
      the break line comprises one of multiple break lines formed in the blade body;
      the sections include an intermediate section located closer to the blade tip than the inner section and located farther from the blade tip than the outer section; and
      the outer, intermediate, and inner sections respectively correspond to the parametrically defined masses $m_1$, $m_2$, and $m_3$ such that each of the sections has a maximum momentum that is substantially equivalent to the maximum momentums of the other sections.

14. The open rotor gas turbine engine of claim 13, wherein the parametrically defined masses $m_1$, $m_2$, and $m_3$ are defined as:

$$m_1+m_2<m_3$$

such that the inner section corresponds to a greater mass than a combined mass of the outer section and the intermediate section.

15. The open rotor gas turbine engine of claim 13, wherein the parametrically defined masses $m_1$ and $m_2$ are defined as:

$$\frac{m_1}{m_2} \approx \frac{r_2^2}{r_1^2}$$

such that a ratio of the masses $m_1$ and $m_2$ is substantially equal to a ratio of radiuses $r_1$ and $r_2$ that respectively correspond to the outer and intermediate sections; and each of the radiuses $r_1$ and $r_2$ define a distance from a center of fan rotation to a center of gravity of the outer and intermediate sections, respectively.

16. The open rotor gas turbine engine of claim 15, wherein the parametrically defined masses $m_1$, $m_2$, and $m_3$ are defined as:

$$m_1 < m_2 < m_3$$

such that the outer section corresponds to lesser mass than the intermediate section and the intermediate section corresponds to lesser mass than the inner section.

17. The open rotor gas turbine engine of claim 13, wherein the parametrically defined masses $m_1$, $m_2$, and $m_3$ are such that each of the sections has a maximum kinetic energy that is substantially equivalent to the maximum kinetic energies of the other sections.

\* \* \* \* \*